US008060593B2

(12) United States Patent
Mangin et al.

(10) Patent No.: US 8,060,593 B2
(45) Date of Patent: Nov. 15, 2011

(54) PROTECTION OF DATA TRANSMISSION NETWORK SYSTEMS AGAINST BUFFER OVERSIZING

(75) Inventors: Christophe Mangin, L'Hermitage (FR); Romain Rollet, Rennes (FR); David Mentre, Rennes (FR)

(73) Assignee: Mitsubishi Electric Corporation, Amsterdam (NL)

( * ) Notice: Subject to any disclaimer, the term of this patent is extended or adjusted under 35 U.S.C. 154(b) by 612 days.

(21) Appl. No.: 11/870,171

(22) Filed: Oct. 10, 2007

(65) Prior Publication Data

US 2008/0256247 A1    Oct. 16, 2008

(30) Foreign Application Priority Data

Oct. 10, 2006 (EP) ..................................... 06291579

(51) Int. Cl.
*G06F 15/16* (2006.01)
*G06F 15/173* (2006.01)
*G08B 23/00* (2006.01)

(52) U.S. Cl. ........... 709/223; 709/225; 709/227; 726/22

(58) Field of Classification Search .................. 709/228, 709/227, 223; 370/229, 474, 235, 231; 726/22, 726/12

See application file for complete search history.

(56) References Cited

U.S. PATENT DOCUMENTS

| 6,003,084 | A  | * | 12/1999 | Green et al. ................... 709/227 |
| 6,438,101 | B1 | * | 8/2002  | Kalampoukas et al. ....... 370/229 |
| 6,950,947 | B1 | * | 9/2005  | Purtell et al. .................... 726/12 |
| 7,257,840 | B2 | * | 8/2007  | Ramaiah et al. ................. 726/22 |
| 7,403,542 | B1 | * | 7/2008  | Thompson ..................... 370/474 |
| 7,515,612 | B1 | * | 4/2009  | Thompson ..................... 370/474 |
| 7,822,837 | B1 | * | 10/2010 | Urban et al. .................... 709/223 |
| 2001/0056492 | A1 | * | 12/2001 | Bressoud et al. ............. 709/227 |
| 2002/0176361 | A1 | * | 11/2002 | Wu et al. ......................... 370/231 |
| 2003/0123394 | A1 | * | 7/2003  | Neale et al. .................... 370/235 |
| 2005/0147100 | A1 |   | 7/2005  | Biran et al. |
| 2006/0045111 | A1 |   | 3/2006  | Sinha et al. |
| 2008/0062879 | A1 | * | 3/2008  | Sivakumar et al. ........... 370/235 |

OTHER PUBLICATIONS

Sarang Dharmapurikar, et al., "Robust TCP Stream Reassembly in the Presence of Adversaries", Proceedings of the USENIX Security Symposium:, XP002402073, Jul. 31, 2005, pp. 65-80.
Christoph L. Schuba, et al., "Analysis of a Denial of Service Attack on TCP", Security and Privacy, XP010230160, May 4, 1997, pp. 208-223.

* cited by examiner

*Primary Examiner* — Aaron Strange
(74) *Attorney, Agent, or Firm* — Oblon, Spivak, McClelland, Maier & Neustadt, L.L.P.

(57) ABSTRACT

A method of managing the allocation to TCP connections of memory blocks of a TCP re-assembly buffer in a TCP network device including a TCP Processing unit, comprises computing a function r(t) on a per connection basis, that measures the occupancy rate of the re-assembly buffer for the relevant TCP connection, and that is updated upon reception of any packet belonging to said TCP connection; and allowing the TCP connection to be closed and the corresponding memory blocks to be released based on a decision scheme that includes at least a first trigger set on the corresponding function r(t), which defines two different states for said function r(t).

14 Claims, 4 Drawing Sheets

PROTECTION OF DATA TRANSMISSION NETWORK SYSTEMS AGAINST BUFFER OVERSIZING

CROSS REFERENCE TO RELATED APPLICATION

This application claims the benefit of priority under 35 U.S.C. §119 from the prior European Patent Application EP 06291579.8, filed on Oct. 10, 2006, the entire contents of which are incorporated herein by reference.

FIELD OF THE INVENTION

The present invention generally relates to data transmission networks, such as Internet. More specifically, it relates to the protection of network systems for performing processing of, for instance, Transmission Control Protocol ("TCP") packets. Such devices are called TCP Network devices in the following and include a TCP Processing unit.

TCP is one of the foundational protocols of the Internet, as defined in Internet Engineering Task Force (IETF) Request for Comments (RFC) 793.

Essential features of TCP are to provide a secure transport layer by supporting out-of-order segment transmission, flow and congestion control mechanisms as well as retransmission of lost data, based on a sliding window mechanism. These functions particular to TCP require that TCP processing units maintain per-connection data structures that store the state of each connection. These data structures, referred to as connection contexts, comprise a re-assembly buffer, a transmission buffer, sliding window maintenance parameters, timers, etc. . . .

Under harsh conditions, e.g. attacks, these connection contexts can consume excessive processing resources, in particular a memory resource, leading to possible exhaustion of this resource in the TCP processing unit.

The fast development of the Internet has driven the need for network systems that perform packet processing at a semantic level above the network layer. Such systems include traffic observation and/or analysis systems, content inspection and transformation systems, Intrusion Detection Systems (IDS) as well as Intrusion Prevention Systems (IPS). Intrusion Detection Systems are of purely passive form, in the sense that they can only alert the receiver of the presence of malicious activity, whereas Intrusion Prevention Systems operate in-line (i.e., cut-through), that is to say analyse network traffic mid-stream.

A common feature of all these systems is that they must maintain per-flow state of the traffic in order to correctly perform higher-level packet processing. Be they in-line systems or end-point systems, a core part of this state holding task consists in maintaining per TCP connection contexts that permit the implementation of TCP processing tasks such as connection establishment control, re-assembly, re-transmission, flow control, congestion control, etc. . . .

BACKGROUND OF THE INVENTION

Modern data transmission systems are subject to increasingly sophisticated attacks, such as for instance attacks of the buffer oversizing type. This kind of attack consists in exhausting the resources of network systems.

Indeed, a possible attack against a TCP network device is to open a large number of fake TCP connections and send segments with inconsistent sequence numbers. For instance, an attacker can send a set of very small segments with non-consecutive sequence numbers throughout the TCP window, and never send the packet located at the Bottom of Window (BoW), or more subtly, send BoW segments at a very low rate. In that context, the TCP network device allocates a set of re-assembly buffers so that it can observe the whole TCP window, but never releases them. By doing that, the attacker forces the TCP network device to allocate a large volume of memory per controlled TCP connection.

Many efforts have been made to prevent or at least limit damages from that kind of attacks, which have let to various types of answers.

Nevertheless, none of the known techniques of protection proves entirely satisfactory in all types of situations. The resource allocation must result from a trade-off between the need to provide the equipment with some level of resilience to attacks at which they may be targeted and the necessity not to degrade too much their operation when they are not under attack.

SUMMARY OF THE INVENTION

An aim of the present invention is to propose an alternative to the known techniques for protecting a TCP network device, including a TCP processing unit, against attacks of the above mentioned type.

To this end, embodiments of the invention are based on a scheme that allows the detection of the allocation of memory blocks of the re-assembly buffer for fake connections and to "kill", i.e., to close such connections. It is based on the analysis of a state variable, updated upon reception of any packet, and a measurement of the usage of the allocated memory used for the re-assembly.

According to a first aspect of the present invention, there is thus proposed a method of managing the allocation to TCP connections of memory blocks of a TCP re-assembly buffer in a TCP network device including a TCP Processing unit, comprising the following steps:
  computing a function r(t) on a per connection basis, that measures the occupancy rate of the memory blocks of re-assembly buffer allocated to the relevant TCP connection, and that is updated upon reception of any TCP packet belonging to the TCP connection; and,
  allowing a TCP connection to be closed and the corresponding memory blocks to be released based on a decision scheme that includes at least a first trigger set on the function r(t) which defines two different states for the function r(t).

Further advantageous features of the invention are defined in the dependent claims.

A second aspect of the present invention relates to a device for managing the TCP re-assembly buffer allocation in a TCP network device including a TCP Processing unit, comprising means for implementing a method according to the first aspect.

A third aspect of the present invention is directed to a data transmission network system comprising a device according to the second aspect.

Finally, fourth and fifth aspects of the present invention relate, respectively, to a computer-readable medium carrying one or more sequences of instructions for implementing a method according to the first aspect, and to a computer program product comprising one or more stored sequences of instructions that are accessible to a processor and which, when executed by the processor, cause the processor to implement a method according to the first aspect.

BRIEF DESCRIPTION OF THE DRAWINGS

The present invention is illustrated by way of example, and not by way of limitation, in the figures of the accompanying drawings in which like reference numerals refer to similar elements and in which.

DESCRIPTION OF PREFERRED EMBODIMENTS

The description that follows is intended at defining the main principles of the proposed scheme that detects memory blocks in the re-assembly buffer allocated to fake TCP connections in a TCP network device.

The TCP Network device is a generic device that performs processing function on a per TCP flow basis. For each managed TCP connection, the device needs to allocate a context that may be updated each time it receives some packets that belong to the attached TCP connection. The TCP network device is able to get TCP packets that come from both directions.

The TCP network device may be a TCP end point server. In that case, received packets are re-assembled and the byte stream contained in the TCP payload is passed to the upper layer. TCP signalling (TCP headers, ACK . . . ) are generated by the TCP processing unit.

The TCP network device may alternatively be a monitoring device that performs statistics upon each TCP connections. In that case, TCP packets are just analyzed by the TCP processing unit and then forwarded to the TCP end-point.

Figure 1:
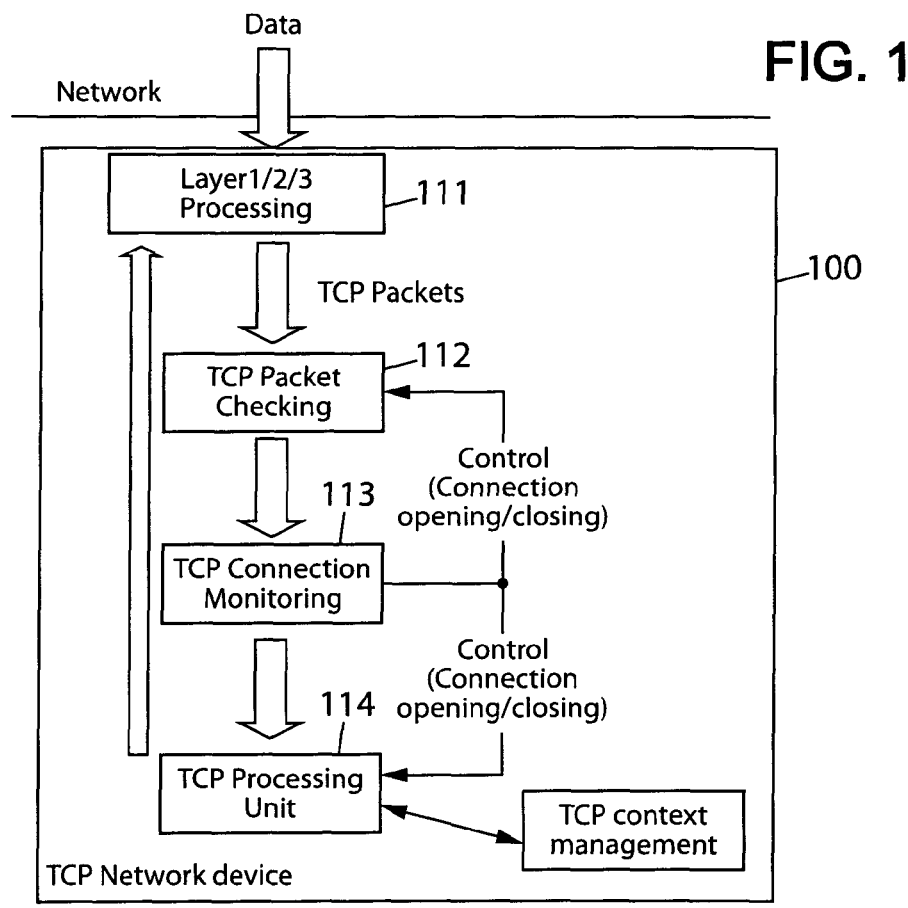
FIG. 1 is a diagram illustrating the architecture of the TCP network device.

FIG. 1 describes the architecture of the TCP Network device 100.

TCP packets are received from the network, and lower layer processing is applied in unit 111. Then, a TCP packet checking unit 112 is in charge of checking the validity of TCP packets before sending them to the other units which include a TCP Connection Monitoring unit 113 and a TCP Processing unit 114. The following processing functions are executed by the unit 112:

TCP checksum calculation and comparison;
connection identification (addresses, ports);
correct sequence numbers;
discard packets that do not belong to opened connections Valid TCP packets are forwarded to the TCP Connection Monitoring unit 113. Other packets are discarded. In particular, ACK packets that were not preceded by SYN and SYN-ACK packets are rejected. In order to achieve this function, the TCP Packet Checking unit 112 has access to TCP packets transiting from both directions. In the case of a TCP end-point server, the TCP Packet Checking unit 112 has access to the signaling part of the TCP packets emitted by the TCP Processing Unit 114. Describing the implementation of those functions is out of the scope and aim of the present description.

The TCP Connection Monitoring unit 113 is in charge of giving authorization to the TCP Processing unit 114 to allocate or release TCP connection contexts, responsive to the initial handshake ACK packets, before forwarding them to the TCP Processing unit 114. Other received TCP packets are directly forwarded to the TCP Processing unit 114. Description of this unit will be detailed below.

At last, the TCP Processing unit 114 performs some tasks from the received TCP packets, depending on the kind of device it is implemented in. One common task is connection context management: operations such as allocation or release of connection contexts are performed taking into account indications sent by the TCP Connection Monitoring unit 113. Describing the operations of the TCP Processing unit 114 is out of the scope and aim of the present description.

Contrary to what occurs in systems according to the prior art, TCP connections may be closed by the TCP Connection Monitoring unit 113 when they are held to be suspicious by virtue of the algorithm of which an embodiment will be presented in the "Principle of Operation" section below.

Connection Opening

Figure 2:
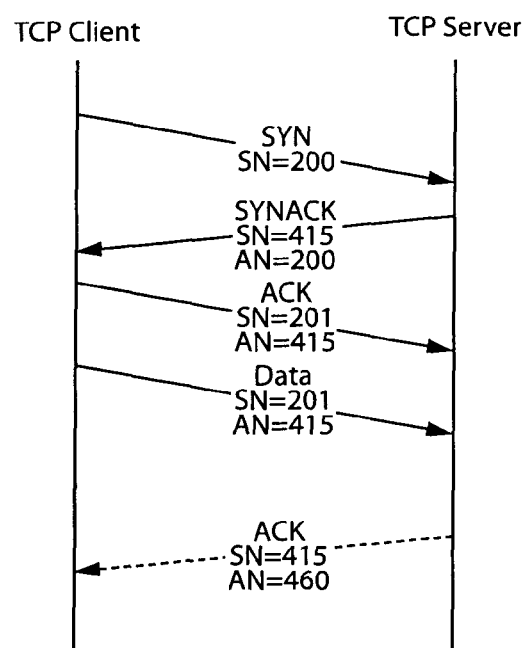
FIG. 2 is a chart illustrating the opening and operation of a TCP connection.

With reference to FIG. 2, operation details of the TCP connection establishment will now be presented.

FIG. 2 shows diagrammatically the exchange of messages between a TCP client and a TCP server, including the sending of synchronisation messages (SYN), of synchronisation and acknowledgment messages (SYNACK) and of acknowledgment messages (ACK). In the figure, the letters "SN" stand for "Sequence Number" and the letters "AN" stand for "Acknowledged sequence Number".

In the prior art, TCP re-assembly buffer allocation is performed once the initial TCP handshake is complete, that is once SYN, SYNACK and ACK packets have been exchanged between the TCP transmitter and the TCP receiver. In the prior art, TCP re-assembly buffer release is performed when the TCP connection is closed (normal case), or when the device detects that there is not enough traffic exchanged between TCP end-points.

Re-Assembly Buffer Management

Figure 3:
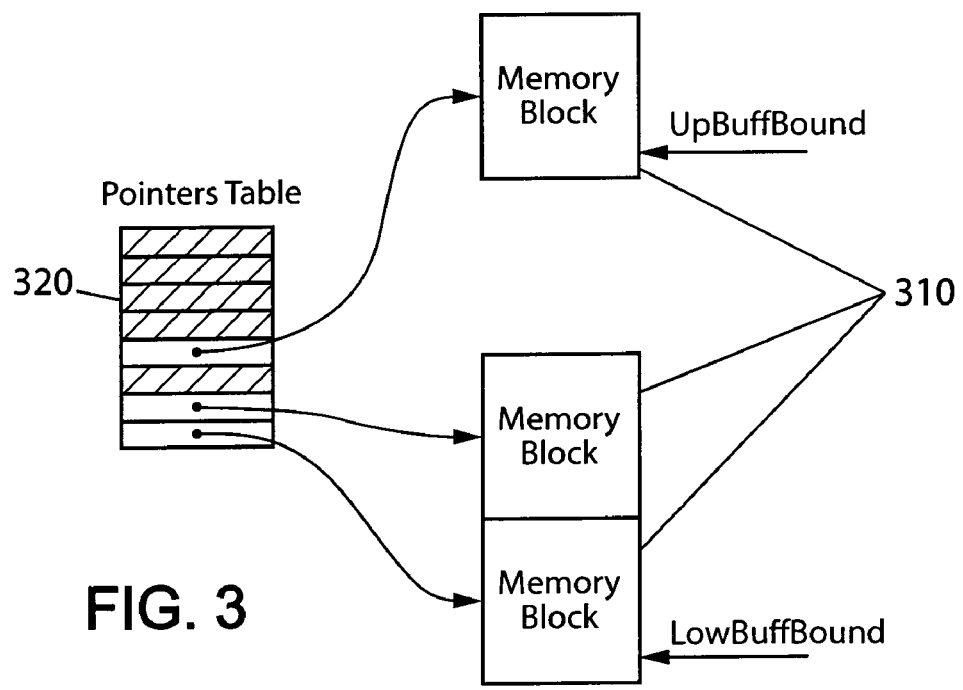
FIG. 3 is a diagram illustrating the re-assembly buffer management.

With reference to FIG. 3, the operation of the re-assembly buffer will now be described in more detail.

When a segment is received by the device, its payload is inserted in the corresponding connection re-assembly buffer according to its sequence number. The lower boundary of the re-assembly buffer (referred to as LowBuffBound) is maintained by interpreting the ACK sequence number conveyed by the ACKs in the direction opposite to the segments'. It is initially set to the value negotiated during the TCP connection establishment handshake.

The upper boundary of the re-assembly buffer (referred to as UpBuffBound) is the maximum of the current UpBuffBound, and the sum of the window size information and the ACK sequence number carried by the latest received ACK. Considering that the TCP network device is located downstream of the TCP transmitter, this way of computing UpBuffBound guarantees it is always consistent with the transmitter's.

The re-assembly buffer is made up of a set of up to n individual fixed sized memory block(s) 310. Memory blocks 310 are picked up from a pool of memory blocks that is shared between all TCP connections. A memory block is allocated to a given connection, i.e. inserted in or appended to the connection's re-assembly buffer upon reception of a segment, as follows:

the sequence number range covered by the segment belongs to the re-assembly buffer sequence number range, i.e. comprised within the range [LowBuffBound, UpBuffBound];

the sequence number range covered by the segment is not totally included in the sequence number range(s) covered by the memory block(s) already allocated to the connection's re-assembly buffer; and, there is at most n−1 memory blocks already allocated to the connection's re-assembly buffer.

For each connection, an n-entry pointers table 320 is used to maintain pointers to the memory blocks constituting the re-assembly buffer. The pointers table is adapted to cover the whole TCP window. This means that the number of pointers equals the size of the TCP window divided by the size of a memory block (the memory blocks being of fixed size). The pointers table is continuous, in respect of the packet sequence numbers.

Upon byte stream progression, memory blocks are freed and returned to the memory block pool.

Associated with each re-assembly buffer is a data structure that stores information about the holes in the re-assembly buffer. Data surrounding a hole are called edges in the following: upper and, respectively, lower edges have greater, respectively, lower sequence numbers as compared to the hole they surround.

Because the packets are of variable size, memory gaps are formed. Using a pointer table as described above nevertheless allows managing re-assembly of the received data without the management of chained lists to be necessary.

Resilience to Attacks

A TCP network device can be subjected to attacks. These attacks can mainly target the resource implemented to maintain the TCP connections states and byte stream content, in particular the re-assembly buffer in the TCP Processing unit. Typical attacks against the TCP network device consist in exhausting these resources in the TCP Processing unit.

A mechanism will now be described that is aimed at mitigating the resource exhaustion attacks consisting in exhausting the resource consisting of the re-assembly buffer (also known as "buffer oversizing").

In the following description, a scheme will be presented that detects the allocation to fake TCP connections of TCP connection contexts by a TCP Processing unit within a TCP network device.

A kind of attacks may thus consist in exhausting the pool of memory blocks by opening a large number of connections and sending segments with inconsistent sequence numbers. For instance, an attacker can send a set of very small segments with non-consecutive sequence numbers throughout the TCP window, and never send the packet located at the Bottom of Window (BoW), or more subtly, send BoW segments at a very low rate.

In that context, the TCP network device allocates a set of re-assembly buffers so that it can observe the whole TCP window, but never releases them. By doing that, the attacker forces the TCP network device to allocate a large volume of memory per controlled TCP connection as illustrated by the re-assembly buffer memory usage example of FIG. 4.

Figure 4:
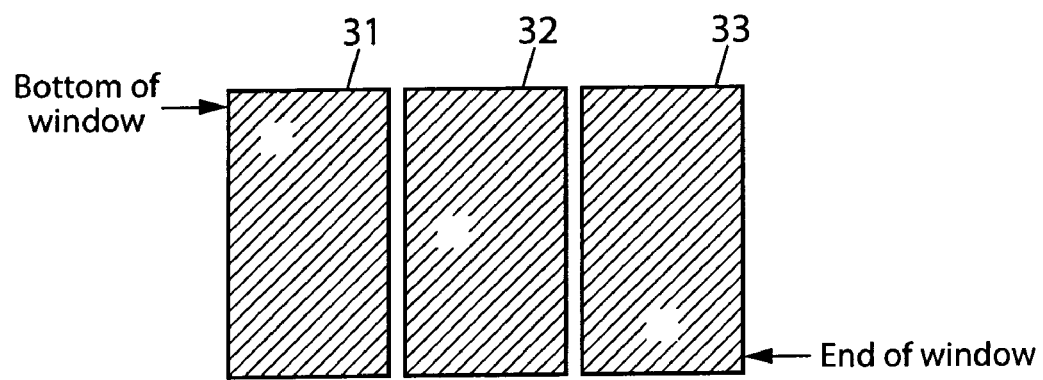
FIG. 4 is a diagram illustrating the occupancy of memory blocks in the re-assembly buffer of a TCP network device.

In FIG. 4, the three rectangles symbolize three memory blocks 31, 32 and 33 of the buffer memory allocated to a given connection. In each one of blocks 31, 32 and 33 the open areas represent ranges of bytes not received for the relevant TCP connection (i.e., holes).

The mechanism that will now be described allows to detect this kind of attacks and to "kill" (i.e., to close) opened connections for which no significant traffic is observed. It is based on the analysis of a state variable, updated upon reception of any packet, and that measures the usage of the allocated memory used for re-assembly.

Principle of Operation

Let us assume that $r(t)$ is a function that measures the dynamic of an occupancy rate of the re-assembly buffers. This function may, for instance, take values comprised between 0 and 1. When it tends toward 1, it characterises a weak occupancy rate, and therefore the possibility that the TCP network device is under attack. Conversely, when it tends toward 0, it reflects that few memory blocks are allocated to the connection and that they are satisfactorily filled (contain few holes). Normally, $r(t)$ should be equal to 0 for a TCP connection for which segments are received in sequence (no hole).

Let us further assume, that $b(t)$ is the number of memory blocks used by the connection, that B is the maximum number of blocks that can be allocated to one TCP connection, and that S is the fixed size of one memory block.

Further, let us assume that $u(t)$ is the fraction of bytes within allocated blocks for which corresponding data have not been received (i.e. the holes).

It comes that $r(t)$ is defined as:

$$r(t)=[u(t)/(b(t)\cdot S)]^p \cdot [b(t)/B]^q \quad (1)$$

where p and q are coefficients that are chosen to give a different weight to both factors of the expression. The first factor measures the memory waste due to holes. The second factor represents the memory allocated to that connection compared to the maximum that is allowed. Combining these two factors in the definition of $r(t)$ given by relation (1) above allows to take both parameters into account.

Attack detection is based on triggers set on $r(t)$. Since a simple threshold comparison may not be sufficient, preferably four states are defined for each connection. These states are denoted Innocuous, Suspicious, Probation and Guilty, respectively.

When a connection is opened, the state of the corresponding function $r(t)$ is initialized to Innocuous. The connection remains in the Innocuous state as long as $r(t)$ is lower than a defined threshold $R_S$. The state changes to Suspicious when $R_S$ is exceeded. The time when the connection enters the Suspicious state is denoted by $t_S$.

The connection is considered as potentially harmful if it remains in this state for a too long period of time, denoted $T_{S,Max}$. Such being the case, the connection state changes to Guilty, and the connection may be closed. Thanks to this condition, connections whose Bottom of Window progress is too slow compared to their End of Window will be intrinsically detected and closed, said Bottom of Window and End of Window being defined as the lowest and highest Sequence Number (SN), respectively, among the set of received and valid TCP packets of the connection.

In the Suspicious state, however, if $r(t)$ becomes lower than a threshold $R_P$ (with $R_P<R_S$) then the state changes to Probation. Stated otherwise, $R_P$ is a threshold value which corresponds to $R_S$ with hysteresis. The time when the connection enters the Probation state is denoted $t_P$.

If r(t) becomes again greater than $R_S$ in the Probation state, then the connection returns to the Suspicious state. However, if the connection stays in the Probation state a rather long time (compared to the time it has remained in the Suspicious state), then the connection is proved to be innocuous and returns to the Innocuous state. This event may be triggered by the condition $$\frac{t-t_P}{t_P-t_S} > V_N$$

that compares the Suspicious and Probation time periods, where $V_N$ is a fixed value that introduces some flexibility to reset the connection state.

Stated otherwise, a trigger is set on the function r(t) which is such that the TCP connection is changed from the Probation state to the Innocuous state when r(t) is below $R_P$ and the condition is met that the time period $t-t_P$ since the connection has been in the Probation state is significantly high compared with the time period $t_P-t_S$ the connection had previously stayed in the Suspicious state.

Figure 5:
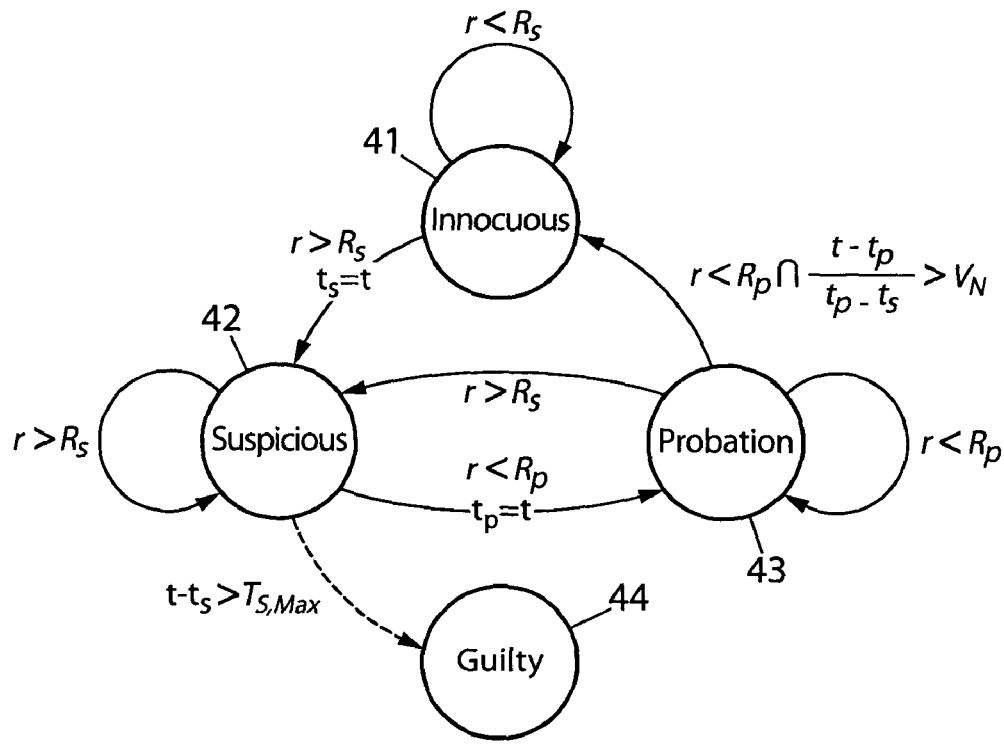
FIG. 5 is a state diagram which shows states associated to the function r(t) according to one embodiment of the present invention.

The state diagram in FIG. 5 summarises the connection automaton described above. This diagram gives the evolution between the connection states referred to as Innocuous, Suspicious, Probation and Guilty. In the diagram:

$R_S$ and $R_P$ are thresholds on r(t), and $R_P < R_S$;

$T_{S,Max}$ is the maximum time a connection can stay in the Suspicious or Probation states (i.e., without returning to the Innocuous state) before changing to the Guilty state and being allowed to be closed;

$V_N$ is the threshold ratio between the Probation and Suspicious periods, which are defined by $t-t_P$ and $t_P-t_S$, respectively;

$t_S$ is the first time when the automaton enters the Suspicious state. It is reset when the connection returns to the Innocuous state; and, $t_P$ is the last time when the automaton enters the Probation state.

Figure 6:
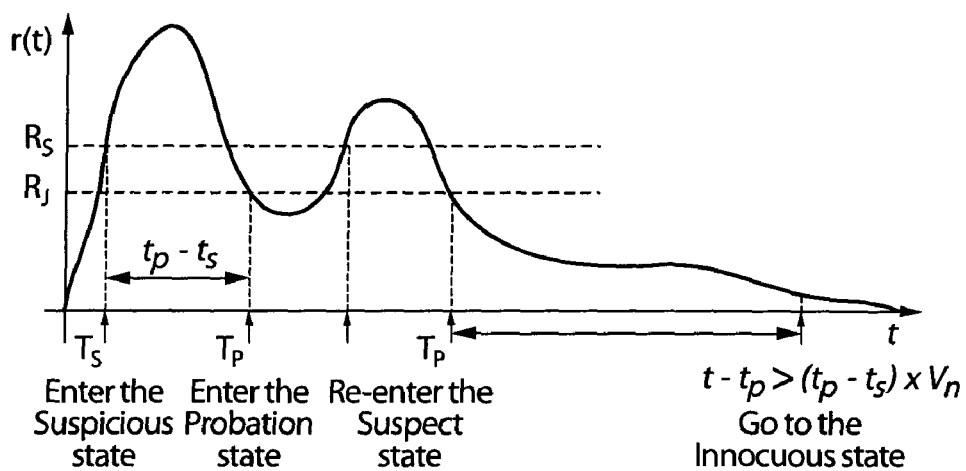
FIG. 6 is a graph of the function r(t) in a first example of operation of the TCP network device; and, FIG. 7 is a graph of the function r(t) in a second example of operation of the TCP network device, leading to the closing of the relevant TCP connection.

The example in FIG. 6 illustrates the state evolution for a connection experiencing errors and retransmissions that induce holes in the TCP re-assembly buffer. Once errors are recovered, r(t) returns to 0 and the connection state is reset to Innocuous.

Figure 7:
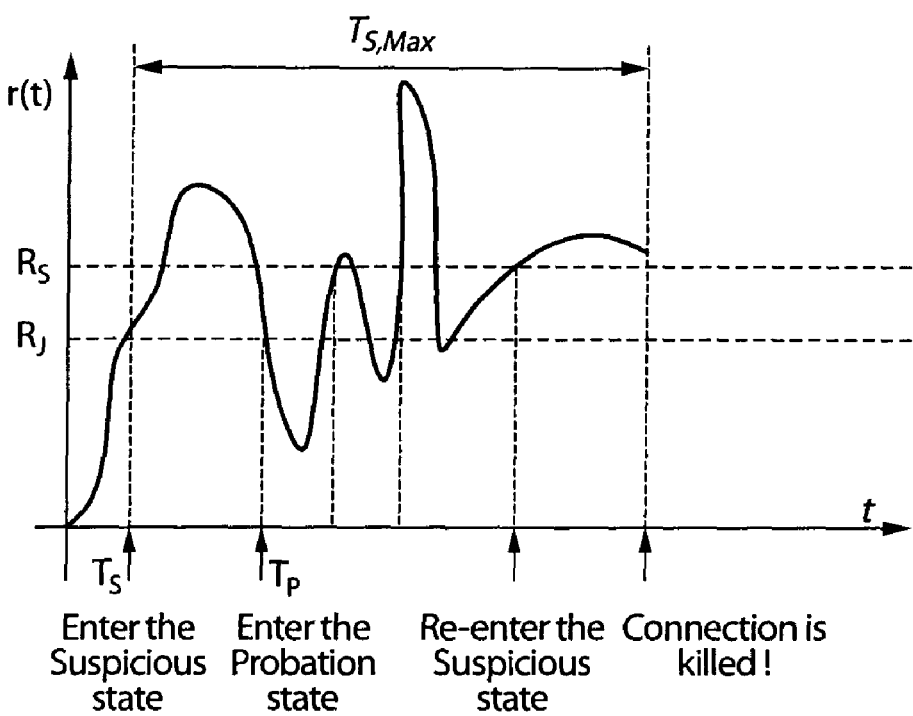

A second example, which is illustrated by FIG. 7, shows how a connection controlled by an attacker is killed. Thanks to the double threshold usage and the $V_N$ condition, the connection is removed although the attacker has frequently released some buffers.

Extension

An extension may be added to enforce this mechanism and to make it be not so dependent on the $T_{S,Max}$ value. Indeed, this parameter is not easy to choose. If it is too low, some innocuous connections are bound to get closed (which is equivalent to a false alarm). On the contrary, if it is too high, the scheme becomes inefficient because connections are closed too slowly and an attacker can still circumvent the defense mechanism by opening a large number of connections within $T_{S,Max}$.

According to the extension, let $E_S$ be the set of TCP connections that are in the Suspicious state. In this set, the connections are ordered according to $t_S$. Each time the number of available memory blocks is under a defined threshold H, then the connection belonging to $E_S$ with the lowest $t_S$ is closed and its memory blocks are released. This scheme leads to close the connections that are the most suspicious.

The extension can be implemented by using a binary tree to sort the connections belonging to $E_S$ according to $t_S$. Then, when the TCP network device is under attack, connection at the root of the tree is closed.

Implementation

The above algorithm can be easily implemented on a per-packet basis since it requires little memory (only three state variables are required: one variable for the state, $t_S$, and $t_P$), and few computations (coefficients p and q which are used to compute r(t) can be fixed values to simplify the implementation).

The present invention can be implemented in hardware, software, or a combination of hardware and software. Any processor, controller, or other apparatus adapted for carrying out the functionality described herein is suitable.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention.

In particular, whereas the invention has been described in connection with the management of TCP connection contexts, other data transmission protocols may advantageously benefit from the advantages of the invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

The invention claimed is:

1. A method of managing an allocation to TCP connections of memory blocks of a TCP re-assembly buffer in a TCP network device including a TCP Processing unit, comprising the following steps:
   computing a function r(t) on a per connection basis, that measures an occupancy rate of the memory blocks of the re-assembly buffer allocated to a relevant TCP connection, and that is updated upon reception of any TCP packet belonging to said TCP connection; and,
   allowing said TCP connection to be closed and corresponding memory blocks to be released based on a decision scheme that includes at least a first trigger set on a corresponding function r(t) which defines two different states for said function r(t),
   wherein the first trigger set on the function r(t) is such that the TCP connection is changed from a first state to a second state when said function r(t) reaches a first threshold value, and
   wherein a second trigger set on the function r(t) is such that the TCP connection is changed from the second state to a third state when said function r(t) passes back a second threshold value which corresponds to the first threshold value with hysteresis.

2. The method of claim 1, wherein the function r(t) comprises a first factor that represents waste of a memory space allocated to the relevant TCP connection that is due to the presence of holes within a sequence of TCP packets received for said TCP connection.

3. The method of claim 1, wherein the function r(t) comprises a second factor that represents the memory space allocated to the relevant TCP connection compared to a maximum memory space that is allowed for said TCP connection.

4. The method of claim 1, wherein the function r(t) is defined as $$r(t)=[u(t)/(b(t)\cdot S)]^p [b(t)/B]^q,$$

where:
   u(t) is a fraction of bytes within allocated memory blocks whose corresponding data have not been received;
   b(t) is a number of memory blocks used by the relevant TCP connection;
   B is a maximum number of memory blocks that can be allocated to one TCP connection;
   S is a fixed size of one memory block; and,
   p and q are coefficients of determined value.

5. The method of claim 4, wherein p and q are coefficients of fixed value.

6. The method of claim 1, wherein the decision scheme is based on triggers, including said first trigger, set on the function r(t) which define at least a first, a second, a third and a fourth states associated to the TCP connection.

7. The method of claim 1, wherein a third trigger set on the function r(t) is such that the TCP connection is changed from the third state to the first state when said function r(t) is below a second threshold value and a condition is met that a time period since the TCP connection has been in the third state is longer than a time period the TCP connection had previously stayed in the second state.

8. The method of claim 1, wherein a fourth trigger set on the function r(t) is such that the TCP connection is changed from the second state to a fourth state when a time period since the TCP connection has been in the second state exceeds a third threshold value.

9. The method of claim 8, wherein the connection may be closed only when the function r(t) is in the fourth state.

10. The method of claim 1, wherein the decision scheme comprises:
    ordering a set of TCP connections that are in the second state according to a time $t_s$ since they have been in said second state; and,
    each time the number of available memory blocks is under a defined threshold, allowing that one of the set of TCP connections that is in the second state to be closed, which has the lowest $t_s$.

11. A device for managing an allocation to TCP connections of memory blocks of a TCP re-assembly buffer in a TCP network device including a TCP Processing unit, comprising:
    a first unit configured to compute a function r(t) on a per connection basis, that measures an occupancy rate of the memory blocks of the re-assembly buffer allocated to a relevant TCP connection, and that is updated upon reception of any TCP packet belonging to said TCP connection; and,
    a second unit configured to allow said TCP connection to be closed and corresponding memory blocks to be released based on a decision scheme that includes at least a first trigger set on the corresponding function r(t) which defines two different states for said function r(t),
    wherein the first trigger set on the function r(t) is such that the TCP connection is changed from a first state to a second state when said function r(t) reaches a first threshold value, and
    wherein a second trigger set on the function r(t) is such that the TCP connection is changed from the second state to a third state when said function r(t) passes back a second threshold value which corresponds to the first threshold value with hysteresis.

12. A data transmission network system comprising a device for managing an allocation to TCP connections of memory blocks of a TCP re-assembly buffer in a TCP network device including a TCP Processing unit, comprising:
    means for computing a function r(t) on a per connection basis, that measures an occupancy rate of the memory blocks of the re-assembly buffer allocated to the relevant TCP connection, and that is updated upon reception of any TCP packet belonging to said TCP connection; and,
    means for allowing said TCP connection to be closed and corresponding memory blocks to be released based on a decision scheme that includes at least a first trigger set on the corresponding function r(t) which defines two different states for said function r(t),
    wherein the first trigger set on the function r(t) is such that the TCP connection is changed from a first state to a second state when said function r(t) reaches a first threshold value, and
    wherein a second trigger set on the function r(t) is such that the TCP connection is changed from the second state to a third state when said function r(t) passes back a second threshold value which corresponds to the first threshold value with hysteresis.

13. A non-transitory computer readable medium storing instructions that, when executed by a processor, cause the processor to implement a method of managing an allocation to TCP connections of memory blocks of a TCP re-assembly buffer in a TCP network device including a TCP Processing unit, comprising the following steps:
    computing a function r(t) on a per connection basis, that measures an occupancy rate of the memory blocks of the re-assembly buffer allocated to a relevant TCP connection, and that is updated upon reception of any TCP packet belonging to said TCP connection; and, allowing said TCP connection to be closed and corresponding memory blocks to be released based on a decision scheme that includes at least a first trigger set on the corresponding function r(t) which defines two different states for said function r(t), wherein the first trigger set on the function r(t) is such that the TCP connection is changed from a first state to a second state when said function r(t) reaches a first threshold value, and wherein a second trigger set on the function r(t) is such that the TCP connection is changed from the second state to a third state when said function r(t) passes back a second threshold value which corresponds to the first threshold value with hysteresis.

14. A computer program product comprising one or more sequences of instructions stored on a non-transitory machine-readable medium that are accessible to a processor and which, when executed by the processor, cause the processor to implement a method of managing an allocation to TCP connections of memory blocks of a TCP re-assembly buffer in a TCP network device including a TCP Processing unit, comprising the following steps:

computing a function r(t) on a per connection basis, that measures an occupancy rate of the memory blocks of the re-assembly buffer allocated to a relevant TCP connection, and that is updated upon reception of any TCP packet belonging to said TCP connection; and, allowing said TCP connection to be closed and corresponding memory blocks to be released based on a decision scheme that includes at least a first trigger set on the corresponding function r(t) which defines two different states for said function r(t), wherein the first trigger set on the function r(t) is such that the TCP connection is changed from a first state to a second state when said function r(t) reaches a first threshold value, and wherein a second trigger set on the function r(t) is such that the TCP connection is changed from the second state to a third state when said function r(t) passes back a second threshold value which corresponds to the first threshold value with hysteresis.

* * * * *